United States Patent [19]

Manno

[11] 4,107,866
[45] Aug. 22, 1978

[54] KNOTLESS MINNOW RIG

[76] Inventor: Joseph T. Manno, Star Rte., Kane, Pa. 16735

[21] Appl. No.: 779,547

[22] Filed: Mar. 21, 1977

[51] Int. Cl.² .............................................. A01K 91/04
[52] U.S. Cl. .................................. 43/44.83; 43/44.85
[58] Field of Search .................... 43/4.5, 42.49, 43.11, 43/44.82, 44.85, 44.2, 44.83; 24/129 R, 129 A, 129 B, 129 C, 71.1, 71.2, 71.3

[56] References Cited

U.S. PATENT DOCUMENTS

| | | | |
|---|---|---|---|
| 1,153,053 | 9/1915 | Forster | 43/44.85 |
| 1,333,101 | 3/1920 | Cooper | 43/44.83 X |
| 1,784,679 | 12/1930 | Paterson | 24/129 C |
| 1,970,752 | 8/1934 | Hughes | 43/44.85 |
| 2,202,976 | 6/1940 | Wise | 43/44.85 |
| 2,227,420 | 1/1941 | Augenblick | 43/44.85 |
| 2,683,937 | 7/1954 | Criswell | 24/71.3 |
| 2,721,354 | 10/1955 | Anderberg | 24/129 B X |
| 3,327,423 | 6/1967 | Kotis | 43/44.83 X |
| 3,675,276 | 7/1972 | Nuse | 24/129 B |
| 3,736,925 | 6/1973 | Erman | 24/129 B |

FOREIGN PATENT DOCUMENTS 20,752  10/1901  United Kingdom ................... 24/129 B

*Primary Examiner*—N. P. Godici
*Attorney, Agent, or Firm*—Cushman, Darby & Cushman

[57] ABSTRACT

A minnow rig and a method of baiting the minnow rig with a live minnow for stream fishing and trolling. The minnow rig includes a treble hook adapted to be disposed in a minnow's tail, a second hook adapted to be disposed in the minnow's head, and a single line connected to and extending between the hooks. The first hook is connected to a free end of the line, while the second hook is connected to the line for allowing adjustability of the second hook with respect to the first hook while still allowing the second hook to be held in a fixed predetermined relative position with respect to the first hook if desired. The second hook is held to the line without knotting of the line and without the necessity for a separate securing device.

8 Claims, 10 Drawing Figures

KNOTLESS MINNOW RIG

BACKGROUND AND SUMMARY OF THE INVENTION

Minnow rigs are extremely popular for stream fishing and for trolling. A minnow rig that is effective holds a live minnow in a natural position, the minnow being hooked in such a way that a game fish attempting to swallow the minnow is hooked.

Conventional minnow rigs on the market usually comprise a treble hook at a free end of the line with a single hook spaced a predetermined distance along the line from the treble hook and securely tied to the line (at the factory) by a friction knot that secures the single hook shank and the line so as to hold the minnow in position. Such conventional rigs are not readily adaptable to minnows of different size, and may cause the minnow to be doubled up, rendering it useless as effective bait. Additionally, the snagging of a hook also can cause movement of the single hook with respect to the treble hook, killing the minnow or otherwise rendering it ineffective as bait. Other commercially available minnow rigs have similar problems associated therewith, the rigs either being too bulky or being arranged in such a way that they often result in the minnow being killed or held in an unnatural position.

According to the apparatus of the present invention, a minnow rig is provided that generally eliminates the drawbacks inherent in prior art commercially available minnow rigs, and according to the method of the present invention a minnow rig may be baited with a live minnow in such a way that a wide variety of sizes of minnows may be accommodated with the minnow always held in a natural position, serving as effective bait.

According to the apparatus of the present invention a minnow rig is provided including a first hook adapted to be disposed in a tail portion of a live minnow, a second hook adapted to be disposed in a head portion of a live minnow, and a single line. The first hook includes a portion for connection to a free end of the line, and the rig additionally comprises means integrally connected to the second hook for effecting connection of the single line to the second hook by friction wrapping for holding the second hook in a predetermined fixed relative position with respect to the first hook along the line. The term "friction wrapping" as used in the present specification and claims refers to knotless connection of a line to a hook by the line, including the threading of the line with respect to surface manifestations of the hook so that frictional forces between line portions and hook portions and other line portions prevent disengagement of the hook and line. The second hook may be constructed in a number of ways as by bending a single wire in a particular configuration or by providing a plate with various surface manifestations. The term "plate" as used in the specification and claims encompasses arched, contoured, and curved members as well as planar members.

According to another aspect of the apparatus of the present invention, an article in general is provided for connection to a continuous strand without knotting of the strand and without accessory securing devices. The article comprises an integral body member, a generally T-shaped projection projecting from the body member, a first strand-receiving surface manifestation formed in the body member, and a second strand-receiving surface manifestation formed in the body member. The generally T-shaped projection and the surface manifestations are arranged in a generally linear relationship with the first and second surface manifestations on opposite sides of the generally T-shaped projection.

According to the method of the present invention, a method is provided for the baiting of a minnow rig with a live minnow, for stream fishing and trolling, the minnow being held in natural position. The minnow rig includes first and second hooks in a single line. The method comprises the steps of placing the first hook through a tail portion of the live minnow, adjusting the length of the single line between the first hook and the second hook so that the second hook may be placed in a head portion of the minnow with the minnow in a natural position, placing the second hook through a head portion of the minnow, and fricting wrapping the single line with respect to the second hook to hold the second hook in the position to which it has been adjusted with respect to the first hook and to thereby hold the minnow in a natural position. The free end of the line may normally be detached from the first hook in which case the line is threaded with respect to the second hook so that the line is in position to be friction wrapped, and the free end of the line is fastened to the first hook after placing the hook in the tail portion of the minnow but before adjusting of the length of the single line between the first hook and the second hook.

It is the primary object of the present invention to provide an apparatus and method for effective positioning of a minnow on a minnow rig, and for tying of a line to an article without knotting of the line and without using accessory devices. These and other objects of the invention will become clear from an inspection of the detailed description of the invention, and from the appended claims.

BRIEF DESCRIPTION OF THE DRAWINGS

FIGS. 4a–6a and FIGS. 4b–6b are side and top plan views respectively of modifications of the second hook for the minnow rig of FIG. 2.

DETAILED DESCRIPTION OF THE INVENTION

Figure 1:
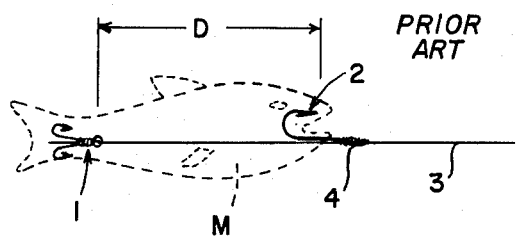
FIG. 1 is a schematic view showing a conventional commercial minnow rig mounting the minnow.

A commercially available prior art minnow rig is shown schematically in FIG. 1 including a treble hook 1 disposed in the tail of a minnow M, a single hook 2, a line 3 and a further line 4 tied with a friction knot for attaching the hook 2 to the line 3. Normally, the minnow rig shown in FIG. 1 comes from the factory with the line 4 securing the hook 2 to the line 3, and if this is not the case, then it is necessary for the user to tie the hook 2 to the line 3 with a line 4 after the hook 2 has been placed in the minnow's mouth, which is extremely difficult. Thus, as a practical matter, the distance D between the first hook 1 and the second hook 2 is fixed and cannot adapt to minnows of different sizes.

Figure 2:
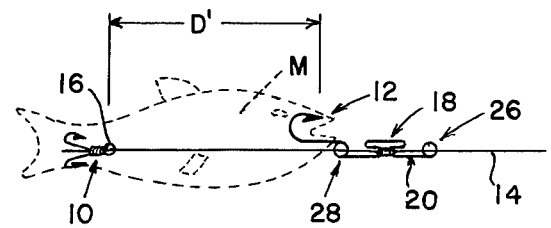
FIG. 2 is a schematic showing of exemplary apparatus according to the present invention for mounting a minnow.

An exemplary minnow rig according to the present invention is shown schematically in FIG. 2 including a first hook 10 (preferably a treble hook), a second hook 12 (preferably a single hook), a single line 14, a portion 16 (such as a loop) of the first hook 10 for connecting a free end of the line 14 to the hook 10, and means 18 integrally connected to the second hook 12 for effecting connection of the single line 14 to the second hook 12 by friction wrapping for holding the second hook 12 in a predetermined fixed relative position with respect to the first hook 10 along the line 14. Using the minnow rig according to the present invention the distance D' between the first hook 10 and the second hook 12 may be adjusted, it being possible to tie the second hook 12 to the line 14 after or just prior to insertion of the hook 12 into the mouth of the minnow M without difficulty. The hook 12 and means 18 together comprise an article of manufacture for connection to a continuous strand (14) without knotting of the strand and without accessory securing devices.

The means 18 includes an integral body member or body portion 20, an integral upstanding formation 22 (see FIG. 3b) having a first portion 23 connected to the body portion 20, a second enlarged portion 24 spaced from the body portion 20, and a third portion 25 interconnecting the second portion 24 and the first portion 23. The line 14 may be wrapped around the third portion 25 of the integral upstanding formation 22. A first strand or line (14) receiving surface manifestation 26 is formed in body member 20, and a second strand-receiving surface manifestation 28 is also formed in the body member 20, the upstanding formation 22, and the first and second surface manifestations 26, 28 being arranged generally in a linear relationship with the first and second surface manifestations 26, 28 on opposite sides of the upstanding formation 22.

Figure 3A:
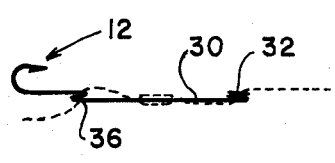
FIG. 3a is a side view of the second hook of FIG. 2
Figure 3B:
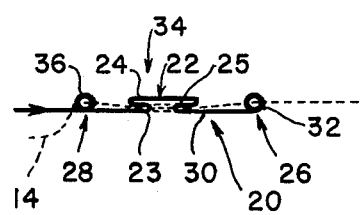
FIG. 3b is a top plan view of the second hook of FIG. 2.

The body member 20 may take a variety of forms such as a continuous wire 30 shown in FIGS. 2, 3a, and 3b. The first surface manifestation 26 of the continuous wire 30 is formed as a first eyelet 32 by bending of the wire 30, the integral upstanding formation 22 is formed as a generally T-shaped projection 34 by bending of the wire 30, and the second surface manifestation 28 is formed as an eyelet 36 by bending of the wire 30. The hook 12 may be formed of the same wire as the body 30, but in any event is integral with the body 30.

Another form that the body member 20 might take is shown in FIGS. 4a, 4b, 5a and 5b, and comprises a plate 38 (the plate 38 need not be planar but may be arched or have a curved contour). The first surface manifestation 26 is formed as a first punched portion 40 which upstands from the surface of the plate 38 for receipt of a line 14 between the bottom of the portion 40 and the top of the plate 38. Preferably, a second, oppositely oriented punched portion 40' is also provided on the same side of the upstanding formation 22 as the first punched portion 40. The upstanding formation 22 preferably comprises a generally T-shaped projection 41 which is punched from the plate 38 and is spaced from the surface of the plate 38 so that a line 14 may be wrapped around the leg portion of the projection 41 between the projection 41 and the top of the plate 38. The second surface manifestation 28 comprises a second punched portion 42 comparable to the first punched portion 40, and another punched portion 42' may be provided on the same side of the generally T-shaped projection 41 as the punched portion 42.

Figure 5A:
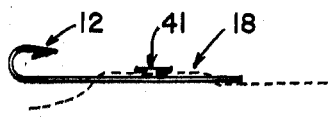
Figure 5B:
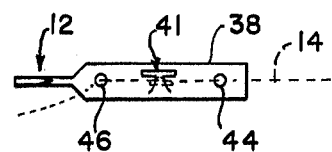

As shown in FIGS. 5a and 5b, when a plate 38 is provided with a generally T-shaped projection 41, the surface manifestations 26, 28 may take a different form than the punched portions 40, 42 such as a first opening 44 and a second opening 46.

Figure 6A:
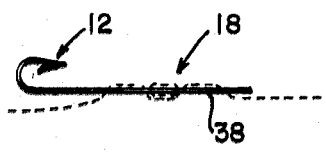
Figure 6B:
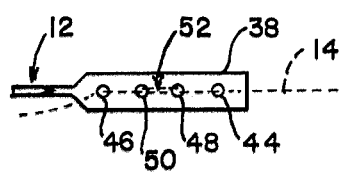

As shown in FIGS. 6a and 6b, the plate 38 may have in place of the generally T-shaped projection 41a pair of middle openings including a first middle opening 48 and a second middle opening 50, the openings 44 and 46 forming a first end opening and second end opening respectively. A connecting solid piece 52, which is a portion of the plate 38, extends between the two middle openings 48, 50.

Figure 4A:
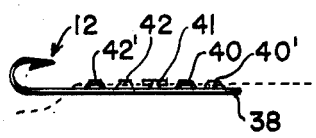
Figure 4B:
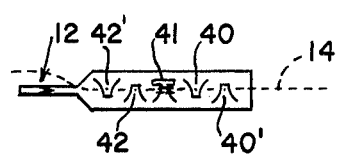

As can be seen by an inspection of the structures of 3b–6b, the means 18 according to the present invention effects securement of the second hook 12 to the single line 14 without knotting and without accessory fastening devices by providing for friction wrapping of the line 14. In the FIG. 3b and 5b embodiments, the line 14 passes through eyelet 32 or opening 44 respectively, is wrapped several times around the leg of the generally T-shaped projection 34 or 41 respectively, and then is passed through the second eyelet 36 or second opening 46 respectively, and on to the portion 16 of first hook 10. Since it is not necessary to tie a knot to secure the line 14 to the hook 12, the entire article can be adjusted (the distance D' adjusted) depending upon the size of the minnow M yet the hook 12 can be secured to the line 14 so that the distance D' remains constant after friction wrapping. The structure of FIG. 4b is utilized in the same manner as the structure of 5b except that instead of passing the line through openings 44 and 46, the line is disposed between the top of the plate 38 and the bottoms of portions 40, 42, the portions 40 and 42 tightly engaging the line 14 and holding it in place. The structure of FIG. 6b is utilized in the same manner as the structure of 5b except that the line 14 is passed through the first and second middle openings 48, 50 several times to wrap the line around the connecting solid piece 52 before the line is passed through the opening 46.

All of the structures of FIGS. 3–6 may be originally attached to the line 14 loosely at the factory, or may be detached from the line 14 with the free end of line 14 detached from the loop portions 16 of first hook 10. When the structure of FIG. 4 is utilized, the means 18 and hook 12 may be detached from line 14 even though the free end of the line 14 is already connected to the loop 16 of first hook 10 since the portion 18 may be secured to the line 14 without the necessity of passing the line 14 through any openings, an accessible free end of the line 14 not being necessary to effect the connection shown in FIG. 4b.

According to the method of the present invention a minnow rig is baited with a live minnow, the minnow rig including a first hook 10, a second hook 12, and a line 14. The method comprises the steps of placing the first hook 10 through a tail portion of a live minnow M, adjusting the length of the single line 14 between the first hook 10 and the second hook 12 so that the second hook 12 may be placed in a head portion of the minnow M with the minnow M in natural position, placing the second hook 12 through a head portion of the minnow M, and friction wrapping the single line 14 with respect to the second hook 12 to hold the second hook 12 in the position to which it has been adjusted with respect to the first hook 10 to thereby hold the minnow in a natural position. When the second hook 12 of FIGS. 3, 5 and 6 is provided already connected to the line 14 (the line 14 passing through the eyelets 32, 36, or the openings 44, 46, and 44, 46, 48 and 50 respectively) with the free end of the line 14 attached to the hook 10, the hook 12 is adjusted along the length of the line 14 merely by making sure the line is not wrapped around the portions 34 or 41 in FIGS. 3 and 5, and providing enough slack so that the line may easily slide until the desired position is reached, at which point a loop of line 14 extending between the eyelets 32, 36 or openings 44, 46 is wrapped around the leg portion of the T-shaped projections 34, 41 respectively, and then the line is pulled taut. With respect to the FIG. 6 embodiment, enough slack is provided in the loops extending between openings 48 and 50 so that the plate 38 can be adjusted a significant distance in either direction along line 14, the hook 12 being then secured in place at its adjusted position merely by pulling the line 14 taut from the end thereof opposite the hook 10. The FIG. 6 structure is primarily adapted for use with a line 14 having a free end normally not connected to the hook 10.

According to the method of the present invention wherein the line 14 has a free end that is originally distinct from the first hook 10, between the steps of placing the first hook 10 through a minnow's tail and adjusting the length of the line between the hooks, there is practiced the further steps of threading the line with respect to the second hook 12 so that the line 14 is in position to be friction wrapped with respect to the hook 12, and fastening the free end of the line 14 to the first hook 10. The threading is accomplished by bringing the line into operative association with both of the surface manifestations 26, 28 (i.e., upstanding portions 40, 42 or openings 44, 46 or eyelets 32, 36) while passing by the generally T-shaped projection 34, 41, and the adjusting step is accomplished by sliding the line 14 when received by the surface manifestations 26, 28 with respect to the manifestations, and the friction wrapping step is accomplished by wrapping the line 14 between the surface manifestations 26, 28 around the generally T-shaped projections'(34, 41) leg portion and pulling the line 14 taut from the end thereof opposite the first hook 10.

When the structure of FIG. 6 is utilized, the step of friction wrapping is accomplished by passing the line 14 through the first end opening 44, passing the line through the first and then the second middle openings 48, 50 respectively several times to wrap the line around the connecting solid piece 52, and passing the line through the second end opening 46, and then pulling the line taut from the side thereof opposite the first hook 10.

While the article of manufacture shown in FIGS. 3-6 according to the present invention may be formed of any suitable material, for ease of manufacture and for minimization of expense it is desirable to form the article from a continuous metal wire, or from a small metal plate, simple stamping, punching, and twisting operations being the only operations necessary to form the simple articles according to the invention.

It will thus be seen that according to the present invention an improved minnow rig has been provided, as well as an improved method for the baiting of a minnow rig with a live minnow, and an improved article for connection to a continuous strand without knotting of the strand and without accessory securing devices. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A minnow rig comprising
a first hook adapted to be disposed in a tail portion of a live minnow,
a second hook adapted to be disposed in a head portion of a live minnow,
a single line,
a portion of said first hook for connection to a free end of said line, and
means integrally connected to said second hook for effecting connection of said single line to said second hook by friction wrapping for holding said second hook in a predetermined fixed relative position with respect to said first hook along said line, said means consisting of at least a first surface manifestation for receiving said line, formed on one side of a generally T-shaped projection; said at least one surface manifestation and said projection disposed in-line, substantially parallel to the direction said line takes when connected up to said hooks; and said surface manifestation and said projection being spaced a fixed predetermined distance apart.

2. A minnow rig as recited in claim 1 wherein said at least a first surface manifestation comprises first and second surface manifestations formed on either side of said T-shaped projection, and in-line, and wherein said generally T-shaped projection consists of a first portion operatively connected to a body portion of said integrally connecting means; a second, enlarged, portion spaced from said body portion, and a third portion interconnecting said second enlarged portion to said body portion; said line adapted to be received by one of said first and second surface manifestations, wrapped around said third portion of said projection and received by the other of said first and second surface manifestations.

3. A minnow rig as recited in claim 1 wherein said means integrally connected to said second hook comprises a wire; said wire bent in such a manner that adjacent said second hook a first eyelet is formed comprising said first surface manifestation.

4. A minnow rig as recited in claim 1 wherein said at least a first surface manifestation comprises first and second surface manifestations formed on either side of said T-shaped projection, and in-line, and wherein said means integrally connected to said second hook comprises a plate having a first opening comprising said first surface manifestation formed therein adjacent said second hook, said generally T-shaped projection punched therefrom and upstanding from the surface of the plate adjacent said first opening and opposite said second hook, and a second opening comprising said second surface manifestation formed therein and adjacent said generally T-shaped projection and opposite said first opening.

5. A minnow rig as recited in claim 1 wherein said at least a first surface manifestation comprises first and second surface manifestations formed on either side of said T-shaped projection, and in-line, and wherein said means integrally connected to said second hook comprises a plate having said first surface manifestation punched therefrom and upstanding from the surface of the plate adjacent said second hook, and generally T-shaped projection punched from said plate and upstanding from the surface of the plate adjacent said first surface manifestation and opposite said second hook, and said second surface manifestation punched from said plate adjacent said generally T-shaped projection and opposite said first surface manifestation.

6. A minnow rig as recited in claim 1 wherein said at least a first surface manifestation comprises first and second surface manifestations formed on either side of said T-shaped projection, and in-line, and wherein said means integrally connected to said second hook comprises a plate having at least four openings therein, at least two of said openings each comprising one of said surface manifestation.

7. A minnow rig comprising
a first hook adapted to be disposed in a tail portion of a live minnow,
a second hook adapted to be disposed in a head portion of a live minnow,
a single line,
a portion of said first hook for connection to a free end of said line, and
means integrally connected to said second hook for effecting connection of said single line to said second hook by friction wrapping for holding said second hook in a predetermined fixed relative position with respect to said first hook along said line, said means comprising a plate having a first opening formed therein adjacent said second hook, a generally T-shaped projection punched therefrom and upstanding from the surface of the plate adjacent said first opening and opposite said second hook, and a second opening formed therein adjacent said generally T-shaped projection and opposite said first opening.

8. A minnow rig comprising
a first hook adapted to be disposed in a tail portion of a live minnow,
a second hook adapted to be disposed in a head portion of a live minnow,
a single line,
a portion of said first hook for connection to a free end of said line, and
means integrally connected to said second hook for effecting connection of said single line to said second hook by friction wrapping for holding said second hook in a predetermined fixed relative position with respect to said first hook along said line, said means comprising a plate having a first surface manifestation punched therefrom and upstanding from the surface of the plate adjacent said second hook, a generally T-shaped projection punched from said plate and upstanding from the surface of the plate adjacent said first surface manifestation and opposite said second hook, and a second surface manifestation punched from said plate adjacent said generally T-shaped projection and opposite said first surface manifestation.

* * * * *